United States Patent
Park et al.

(10) Patent No.: US 7,209,418 B2
(45) Date of Patent: Apr. 24, 2007

(54) METHOD FOR REPLACING DEFECTIVE BLOCK WITH GOOD BLOCK TO RECORD DATA IN OPTICAL DISC APPARATUS

(75) Inventors: Sung Baek Park, Pyungtack-si (KR); Seung Pill Kong, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 738 days.

(21) Appl. No.: 10/461,438

(22) Filed: Jun. 16, 2003

(65) Prior Publication Data

US 2004/0004918 A1    Jan. 8, 2004

(30) Foreign Application Priority Data

Jul. 5, 2002   (KR) ............... 10-2002-0039059

(51) Int. Cl.
*G11B 5/09* (2006.01)

(52) U.S. Cl. .................. 369/47.33; 369/47.34; 369/47.28; 369/53.17

(58) Field of Classification Search ............. None
See application file for complete search history.

(56) References Cited

U.S. PATENT DOCUMENTS

2001/0043525 A1* 11/2001 Ito et al. .............. 369/47.14

* cited by examiner

*Primary Examiner*—Muhammad Edun
(74) *Attorney, Agent, or Firm*—Ked & Associates, LLP

(57) ABSTRACT

A method for replacing a defective block with a good block in an optical disk allows data recording operations to be effectively performed. The method temporarily stores data that would have otherwise been recorded in a defective area of an optical disc in a temporary buffer. The method then stores the data in the temporary buffer in a spare area of the optical disc after the normal data recording operation is completed, or if the amount of data in the buffer exceeds a predetermined memory capacity. The method can continuously and quickly perform a general data recording operation, effectively avoid a system load increase due to frequent track movements on an optical disc, and appropriately record real-time data without the loss of data.

15 Claims, 7 Drawing Sheets

(a) There are no defective sectors (b) There is one defective sector

The last LSN : m

Good Sector     NA : Not Applicable

Defective Sector     0 ~ m : LSN

METHOD FOR REPLACING DEFECTIVE BLOCK WITH GOOD BLOCK TO RECORD DATA IN OPTICAL DISC APPARATUS

BACKGROUND OF THE INVENTION

1. Field of the Invention

The present invention relates to a method for replacing a defective block with a good block when recording data on an optical disc apparatus.

1. Description of the Related Art

Recently, it is expected that a rewritable optical disc such as a digital versatile disc-random access memory (DVD-RAM) or a digital versatile disc-rewritable (DVD-RW) capable of permanently recording and storing high-quality video data and audio data will be developed and commercialized.

There is proposed a method for processing a defect contained in a recording medium of an optical disc, for example, such as the DVD-RAM, DVD-RW, etc., such that data of the optical disc can be stably stored and reproduced.

First, the standard related art method for processing a defect contained in the optical disc will be described.

FIG. 1 is a view illustrating a method for replacing a defective block with a good block when recording data in a conventional optical disc apparatus. As shown in FIG. 1, the DVD-RAM disc is divided into a lead-in area (LIA), a data area and a lead-out area (LOA). A primary spare area (PSA) is contained at the head of the data area, and a secondary spare area (SSA) is selectively contained at the tail of the data area.

The optical disc apparatus for recording and storing external input data, encodes and modulates the external input data into a record signal appropriate for recording, and then records data to the data area of the optical disc. The data is recorded based on a unit of an error correction code (ECC) block having a predetermined size. As shown in FIG. 1, where a defective area is contained in the data area, the data that would have been recorded in the defective area is instead recorded in the spare area.

Thus, where the defective area is contained in the data area of the optical disc, the optical disc apparatus replaces the defective area with the spare area. When a data playback operation is carried out, the data recorded in the spare area is read and reproduced. As a result, a data recording error can be prevented.

Next, a method for processing a defect contained in an optical disc on the basis of a related art DVD-RAM system will be described in detail.

The DVD-RAM system processes defects by using defect management areas (DMAs) on the DVD-RAM disc. Four DMAs contain information on the structure of the data area and on the defect management. A method of managing defects in the DVD-RAM disc will be described on the basis of the structure of the data area, algorithms of managing defects and a system operation.

First, the data area structure of the optical disc will be described with reference to FIG. 2.

In the DVD-RAM, an information area is divided into a lead-in area, a data area and a lead-out area. The data area consists of a user area and spare areas and is divided into 35 zones including Zones 0 to 34. Sectors of the user area are numbered with logical sector numbers (LSNs). The spare areas include a primary spare area (PSA) and a secondary spare area (SSA). The disc shall have one primary spare area in Zone 0 and may have one expandable secondary spare area in Zone 34.

There are four DMAs per side on a disc, and two of the DMAs, DMA 1 and DMA 2, shall be located near the inner diameter of the disc and the other two, DMA 3 and DMA 4, shall be located near the outer diameter of the disc. The contents of the four DMAs shall be identical. The first ECC block of each DMA, called the disc definition structure/primary defect list (DDS/PDL) block, shall contain a DDS and a PDL, and the second ECC block of each DMA, called the secondary defect list (SDL) block, shall contain an SDL.

The DDS shall be recorded at the end of the formatting process, and specifies information of the formatted disc structure such as the number of zones, sector numbers of the first and last sectors of the PSA, a start LSN for each zone of Zones 0 to 34 and so on. The PDL shall contain the number of defective sectors and the entries of all defective sectors identified at formatting, and each entry shall specify the sector number of the defective sector.

Where a defective area is found while data is reproduced or recorded, the SDL shall contain entries, which contain the sector numbers of the first sectors of the defective ECC blocks, the sector numbers of the first sectors of the spare blocks which replace them, and a status of linear replacement (SLR) indicating whether a defective block has been replaced with a replacement block. Further, the SDL contains start sector number of the SSA, flags indicating the availability of spare blocks in the corresponding spare area, the number of entries in the SDL and so on. Here, "0b" in the SLR indicates that the defective block has been replaced with a spare block, and "1b" in the SLR indicates that the defective block has not been replaced.

Next, an algorithm of managing a defect will be described.

Defective sectors are handled by a slipping replacement algorithm (SRA), by a linear replacement algorithm (LRA), by a direct pointer method (DPM) or a block skipping algorithm (BSA).

First, the SRA will be described with reference to FIG. 3.

The SRA shall be applied over the whole data area if defective sectors are listed in the PDL. A defective data sector registered in the PDL shall be replaced by the first good sector before the defective sector. Each defective sector causes all data sectors located before the defective sector to be slipped toward the top of the data area by the number of the defective sectors, so sectors located in the head of the user area of the Zone 0 shall be slipped toward the PSA located before the user area of Zone 0. Referring to FIG. 3, the above-described procedure will be readily understood. An LSN is allocated to a sector as shown in FIG. 3. The sector numbers of the defective sectors are listed in the PDL, and the defective sectors shall not be used for recording user data.

Next, the LRA will be described with reference to FIG. 4.

The LRA is used to handle defective and deteriorated sectors found after formatting. These may be defective sectors which were not registered in the PDL during formatting or sectors damaged by excessive overwrite cycles. The replacement shall be performed in units of 16 sectors, i.e., a data block (one ECC block).

The defective block shall be replaced by the first available good spare block of the PSA. If there is no spare block left in the PSA, the defective block shall be replaced by the first available good spare block of the SSA if it has been allocated. The first available good spare block of the PSA is the first available good block immediately before the first replacement block registered in the SDL. If there is no replacement block listed in the SDL, then the first available good spare block of the PSA is the first good block immediately before the first data block.

If the PSA is exhausted and an SSA has been allocated, then the first available good spare block is the outermost unused good block of the SSA. Defective sectors in the spare area and the corresponding replacement sectors, which have been already registered in the PDL or SDL, shall not be used as spare sectors.

If a block to be read from or written to is listed in the SDL with an SLR of "0b", then the data shall be read from or written to the replacement block of the spare area pointed to by the SDL. But if a block to be read from is listed in the SDL with an SLR of "1b", then the partially corrected data or padding data of "0b" for all bits shall be returned.

Next, the DPM will be described.

If a replacement block listed in the SDL is later found to be defective, then the DPM shall be applied to changing the SDL. In this method, an SDL entry in which a defective replacement block has been registered shall be modified by changing the sector number of the first sector of the replacement block from the defective replacement block to a new one. Because the sector number of the defective replacement block is changed to the sector number of the new replacement block, the number of entries in the SDL is unchanged.

Finally, the BSA will be described.

In order to guarantee a minimum bit rate for real-time data recording and playback, real-time data should not be replaced by the LRA. In other words, the real-time data cannot be recorded in spare blocks as replacement blocks by the LRA or in the defective blocks found in the process of recording the real-time data.

If the real-time data is to be recorded in a block listed in the SDL, the data shall be skipped or shall be recorded in the next available data block. Then, the SLR should be changed to "1b" and the field of sector number of the first sector in the replacement block should be maintained. If a defective block is found while real-time data recording, then the data shall be skipped or the next available data block is used to record the data and the defective block should be listed in the SDL with an SLR of "1b".

Now, a process of managing a defect on the basis of an operation of an optical disc system will be described. The system operation includes a disc formatting process, a data writing process and a data reading process in relation to functions of writing data to the disc and reading data from the disc.

First, the disc formatting process will be described.

A disc shall be formatted before use. Formatting is performed by either initialization or re-initialization. There is no DMA recorded on the disc before the formatting process. If there are DMAs recorded on the disc before the formatting process, then the process shall be regarded as re-initialization. After formatting the disc, the four DMAs shall be recorded. All DDS parameters shall be recorded in four DDS sectors.

The defective sectors in the user area and spare area, found during formatting, are handled by the SRA after the formatting process. So the sector number of the last sector of the PSA and the start LSN for each zone, which are determined according to the SRA, are recorded in the DDS sector, and the number of the defective sectors, and the sector numbers of the defective sectors, are recorded in the PDL sector. If the number of defective sectors to be registered in the PDL exceeds a criterion, then those defective sectors, which cannot be registered in the PDL, shall be registered in the SDL.

Next, the data writing process will be described.

When data is written, defective sector(s) listed in the PDL shall be skipped and the, data shall be written in the next sector according to the SRA. If a block to be written to is found to be defective, then the defective block may be replaced by the first available good spare block according to the LRA, or may be skipped according to the BSA. And if a block to be written to is listed in the SDL, then the block may be replaced according to the LRA, or may be skipped according to the BSA.

Finally, the data reading process will be described.

When data is read, defective sector(s) listed in the PDL shall be skipped and the data shall be read from the next sector according to the SRA. If a data block to be read is listed in the SDL with an SLR of "0b", then the data shall be read from a replacement block in the spare area pointed by the SDL according to the LRA. But if a data block to be read from is listed in the SDL with an SLR of "1b", then the partially corrected data or padding data of "0b" for all bits shall be returned. If a block to be read from is found to be defective and correctable, then the defective block may be replaced by the first available good spare block according to the LRA.

Problems when data is recorded using the conventional defect processing method will be described.

While a predetermined length of data (e.g., data corresponding to a size of one to ten ECC blocks) is recorded in response to a recording request, errors can occur if a middle portion of the data would be recorded in a defective area of the disk. For instance, the disk may contain a defect in a user area to which the fifth data block would be recorded.

The following method is used for verifying a defect of a disc while data is recorded on a digital versatile disc-random access memory (DVD-RAM). After all items of data corresponding to the recording request are recorded in the disc, the recorded data is read back from the disk. The recording apparatus then attempts to verify that a physical ID (PID) and others are appropriately read back from the disk. If the PID and others are appropriately read, it is determined that no defect has occurred. In other words, no data was recorded in a defective portion of the disk. However, if the PID and others are not appropriately read back from the disk, it is determined that data may have been recorded in a defective sector. If a rewritable disc is inserted, the system reads and keeps DMA data from the disc.

Information associated with a position of the first sector of a defective block (to which the fifth data block was recorded), and a position of the first sector of a replacement block, are recorded in the DMA. The optical pickup is thereafter jumped to a spare area and then the fifth data block is recorded in the replacement block. The optical pickup is jumped to a position for recording corresponding data in response to the next recording request.

Where a defective block is found in an area for recording data, or a defective block is registered in the SDL while external input data is recorded, the optical pickup is moved to the spare area while a general data recording operation is suspended, the data is recorded in the replacement block, and the general data recording operation re-starts. As a result, there are problems in that a system load increases due to frequent track movements on the optical disc and hence the data recording operation is delayed.

The delays associated with moving the optical pickup to a replacement area can cause problems when attempting to record real-time video or audio data. If the optical pickup is moved to a replacement block area, in order to store real-time data that would have otherwise been recorded in a defective block, the delay can become too great, and some of the real-time data may be lost.

SUMMARY OF THE INVENTION

Therefore, the present invention has been made in view of the above problems, and it is an object of the present invention to provide a method for replacing a defective block with a good block to record data in an optical disc apparatus. In a method embodying the invention, data is temporarily stored based on a unit of an error correction code (ECC) block to be recorded in a defective area of an optical disc such as a digital versatile disc-random access memory (DVD-RAM) or a digital versatile disc-rewritable (DVD-RW). The method replaces the defective area with a spare area of the optical disc when a data recording operation is completed or when the data temporarily stored exceeds a predetermined memory capacity. The method collectively records the data to the spare area, thereby continuously and quickly carrying out the data recording operation.

A method embodying the invention may comprise the steps of: (a) temporarily storing, in the optical disc apparatus, data that would have otherwise been recorded in a defective area that has been detected while the data recording operation is being carried out; and (b) collectively recording the temporarily stored data, in a replacement recording area corresponding to the defective area after the other data recording has been completed.

In another method embodying the present invention, data that would have been recorded in a defective area that has been detected while a data recording operation is carried out is temporarily stored; an amount of the temporarily stored data is compared with a predetermined memory capacity; and the temporarily stored data is collectively stored in a replacement recording area corresponding to the defective area based on a result of the comparison.

In yet another method embodying the present invention, information about a detected defective area is temporarily stored while a data recording operation is carried out; source data that would have otherwise been recorded in the defective area is identified based on information about the temporarily stored defective area and a host's recording command; and the identified data is recorded in a replacement recording area corresponding to the defective area.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, preferred embodiments of a system and method for replacing a defective block with a good block to record data in accordance with the present invention will be described in detail with reference to the annexed drawings.

Figure 1:
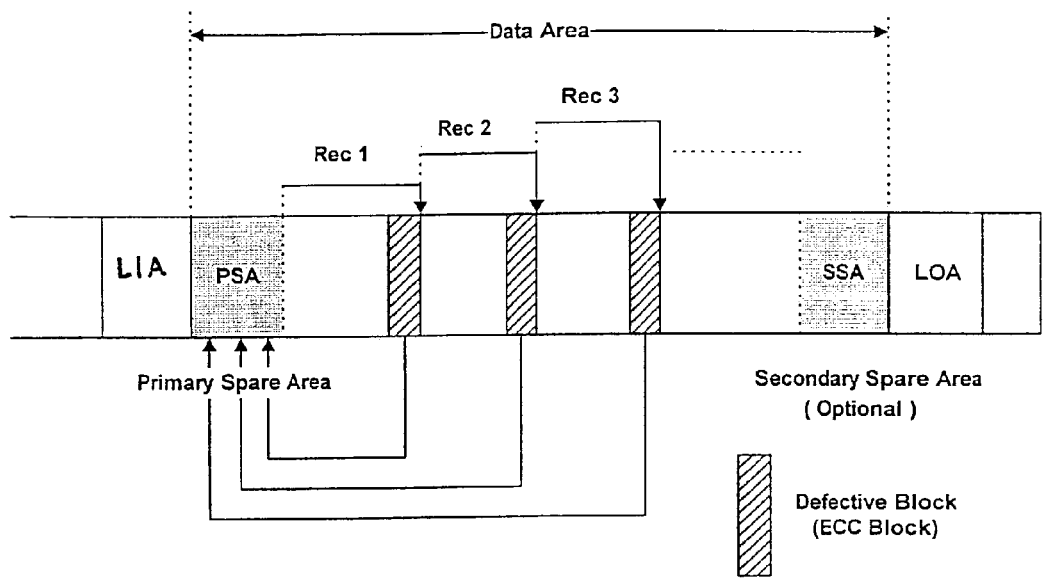
FIG. 1 is a view illustrating a method for replacing a defective block with a good block to record data in a conventional optical disc apparatus.
Figure 2:
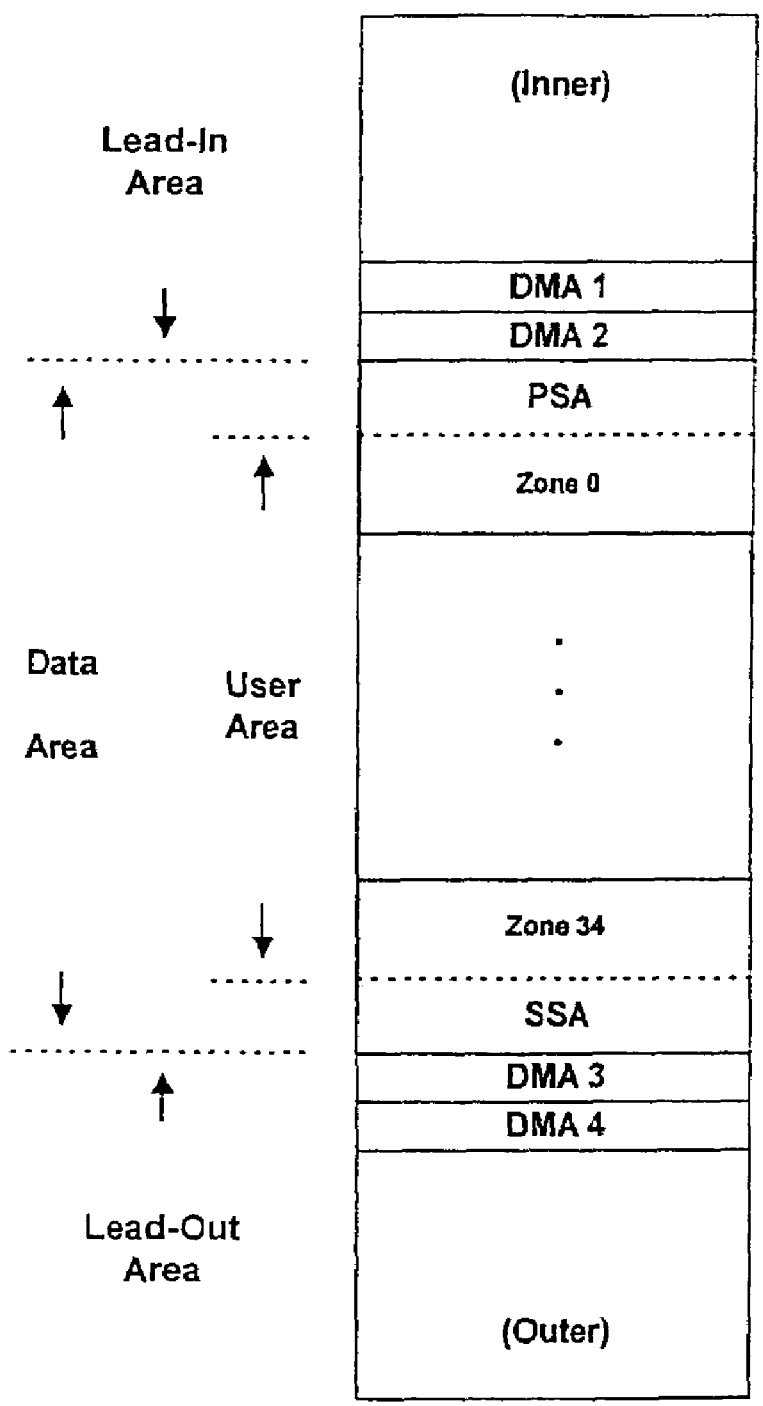
FIG. 2 is a view illustrating the structure of a data area of an optical disc in the conventional optical disc apparatus.
Figure 3:
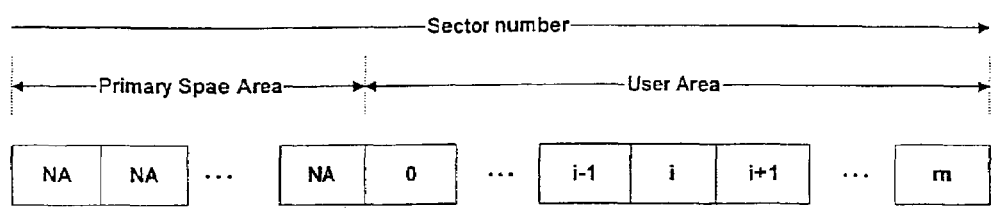
FIG. 3 is a view illustrating a slipping replacement algorithm (SRA) for managing a defect in a digital versatile disc-random access memory (DVD-RAM)
Figure 3:
Figure 3:
Figure 3:
Figure 4:
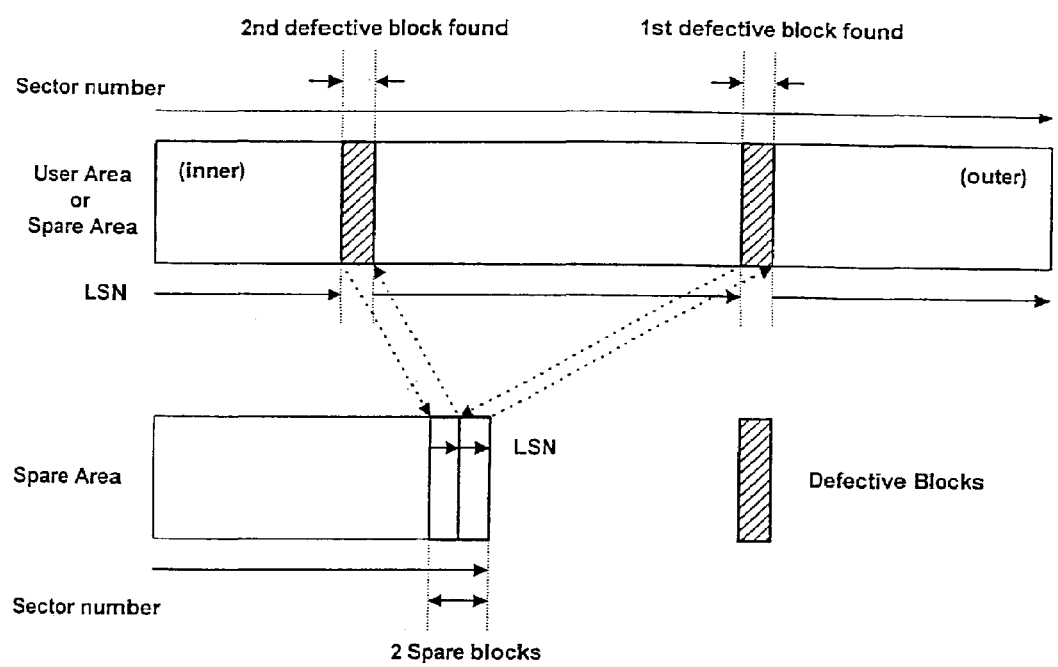
FIG. 4 is a view illustrating a linear replacement algorithm (LPA) for managing a defect in the DVD-RAM.
Figure 5:
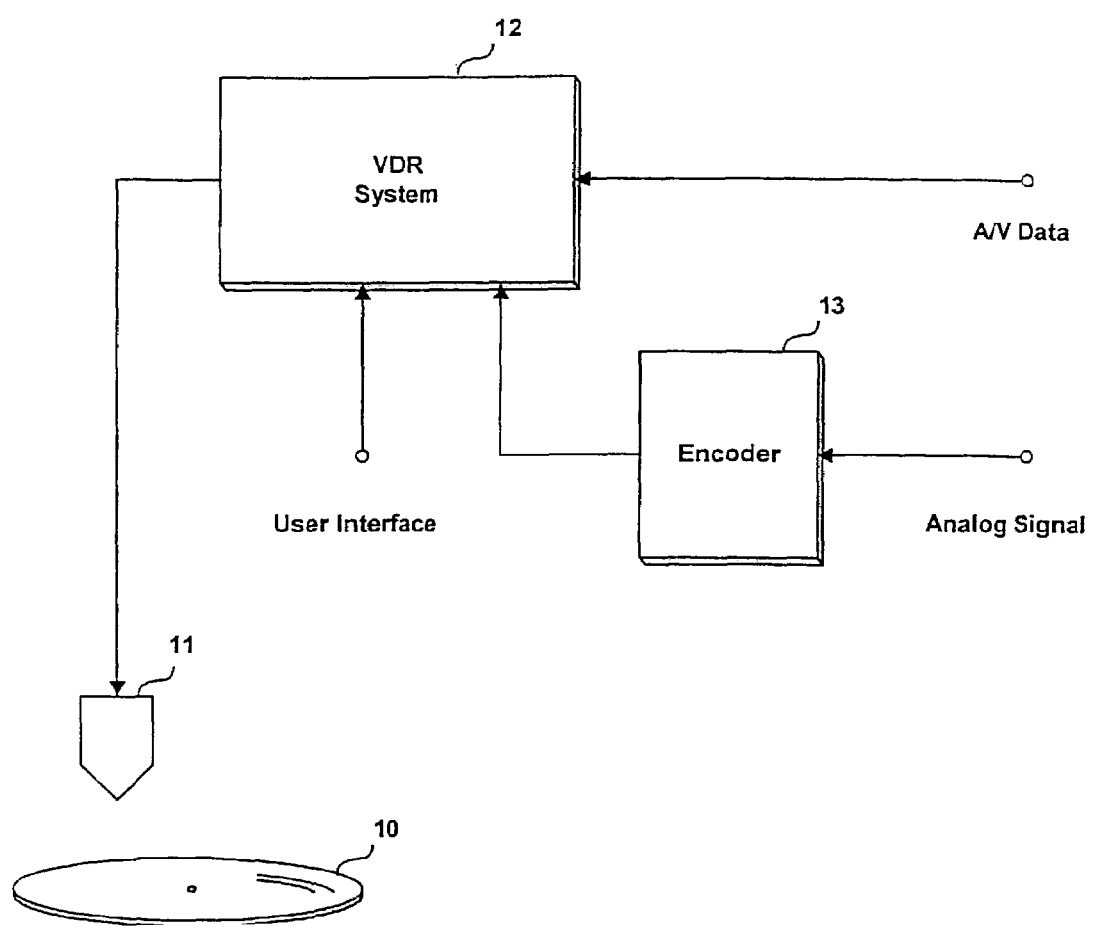
FIG. 5 is a view illustrating the configuration of an optical disc apparatus to which a method for replacing a defective block with a good block to record data is applied in accordance with the present invention.

FIG. 5 is a view illustrating the configuration of an optical disc apparatus capable of performing a method embodying the invention. The optical disc apparatus, such as a video disc recorder (VDR), includes an optical pickup 11 for recording a signal to an optical disc 10 or for reading data from the optical disc 10; a VDR system 12 for processing data read from the optical disc 10 or for modulating an external input data stream into a record signal appropriate for recording; and an encoder 13 for encoding an external analog signal and outputting the encoded analog signal to the VDR system 12.

The VDR system 12 is capable of detecting a defective area contained in a data area of an optical disc such as a digital versatile disc-random access memory (DVD-RAM). Moreover, the VDR system 12 replaces the defective area with a spare area and then records data that would have otherwise been recorded in the defective area in the spare area.

Figure 6:
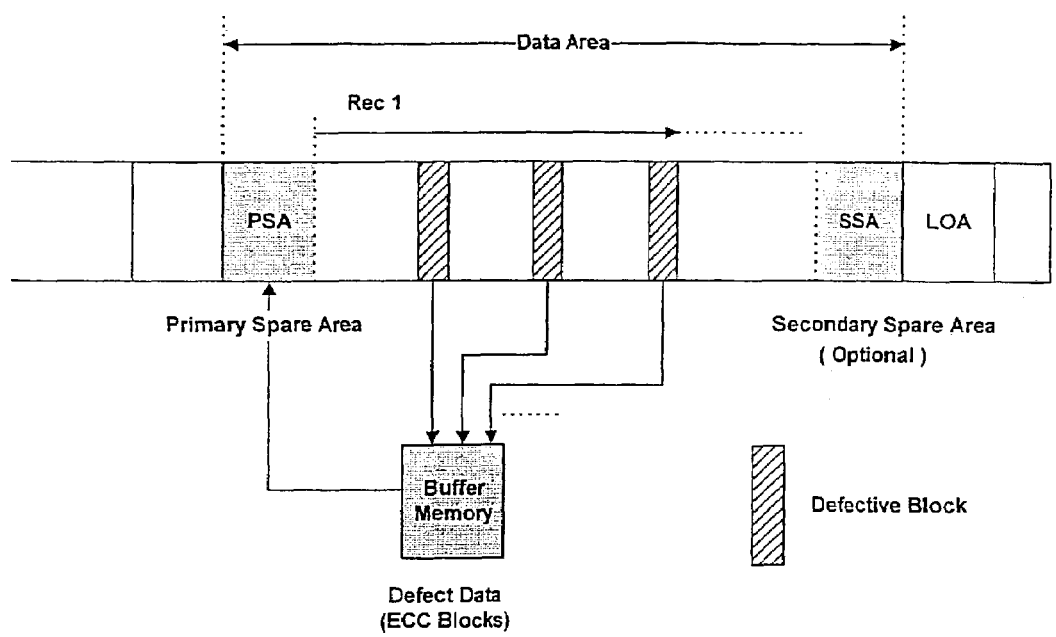
FIG. 6 is a view illustrating a procedure for replacing a defective block with a good block to record data in accordance with the present invention.
Figure 7:
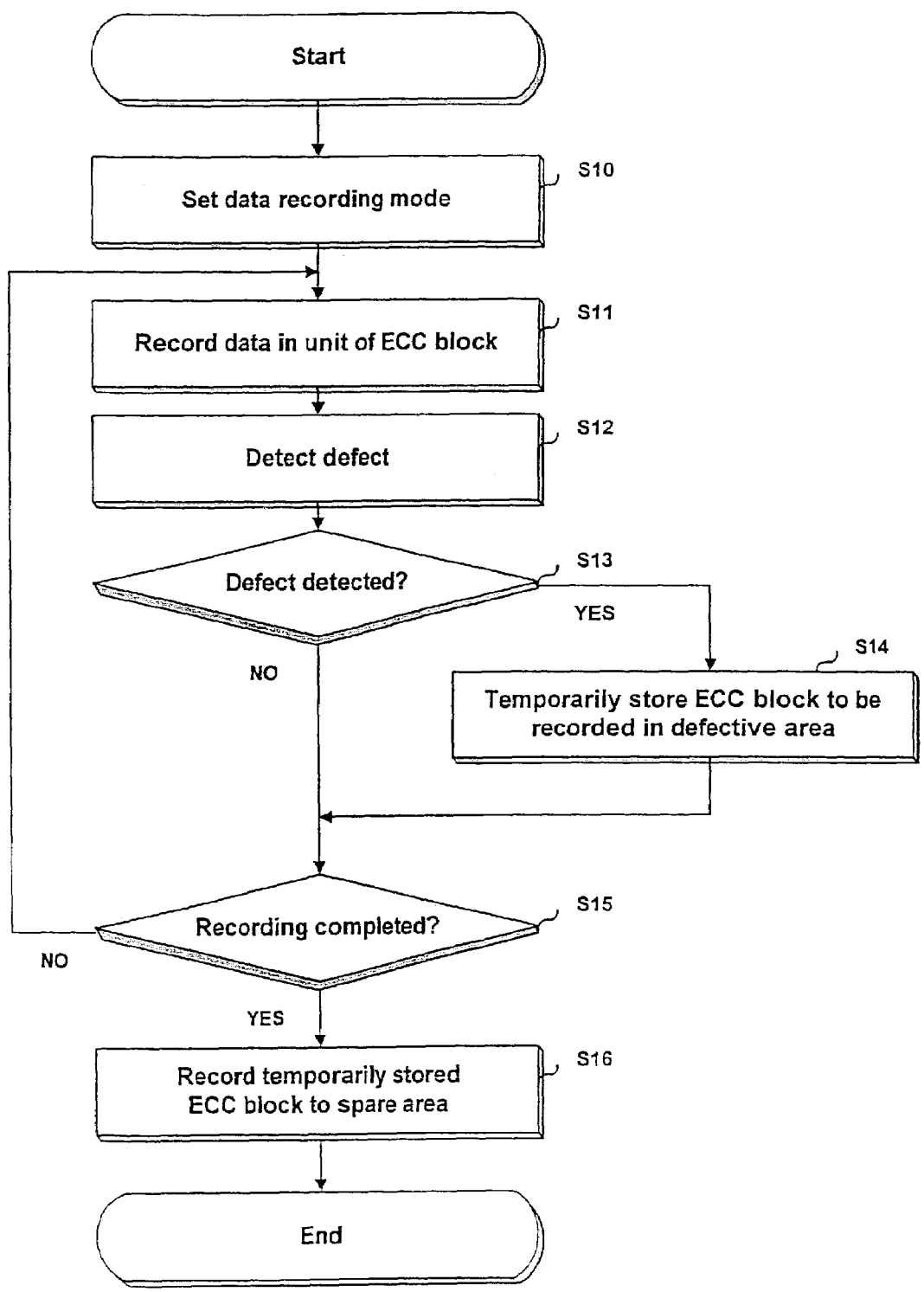
FIG. 7 is a flowchart illustrating a method for replacing a defective block with a good block to record data in accordance with the present invention.

FIG. 6 is a view illustrating a procedure for replacing a defective block with a good block to record data, in accordance with the present invention. As shown in FIG. 6, while a general data recording operation is continuously carried out, if the VDR detects a defective area, the VDR system 12 temporarily stores, in a buffer memory, data that would have otherwise been recorded in the defective area. After the normal data recording operation is completed, the VDR system 12 collectively records, in the spare area, all of the collected data which has been temporarily stored in the buffer memory. This operation will be described in detail with reference to. FIG. 7.

FIG. 7 is a flowchart illustrating a method embodying the present invention for replacing a defective block with a good block to record data.

Once an optical disc 10 such as the DVD-RAM is inserted into the optical disc apparatus, the VDR system 12 sets an operating mode to a data-recording mode at step S10. The VDR system 12 modulates external input data into a signal appropriate for recording, and carries out the general data recording operation to record the input data in the data area of the DVD-RAM at step S11.

As the VDR system 12 carries out the data recording operation, it detects a defective area contained in the data area at step S12. For example, where a level of an electric signal reflected and photoelectrically converted in relation to the data based on the unit of the ECC block exceeds a predetermined reference signal level, a recording position corresponding to the electric signal is detected as a defective area. A defective area might also be detected based on whether a physical ID (PID) or other data are appropriately readback from the disk after a recording operation has been performed.

If a defective area is detected by the above-described procedure at step S13, the data which would have otherwise been recorded in the defective area is temporarily stored in buffer memory at step S14. In some embodiments of the invention, defect management information such as DMA for identifying the defective area may also be updated at this point in time. Because the apparatus does not stop to record the information now temporarily stored in the buffer memory into a spare area on the disc, the data recording operation can be continuously carried out.

Once the VDR system 12 appropriately terminates the data recording operation at step S15, the VDR system 12 records the temporarily stored data in a spare area on the disk in step S16.

By using this method, the optical disc apparatus can continuously carry out a general data recording operation, even though a defective area exists in the optical disc. When the normal data recording operation is completed, the optical disc apparatus replaces the defective area with the spare area, by collectively and quickly recording, in the spare area, the full set of data temporarily stored in the buffer memory.

In an alternate embodiment of the present invention, if the set of data stored in the buffer memory exceeds a predetermined buffer capacity before the normal recording operation is completed, the recording operation is paused and the accumulated set of data stored in the buffer is recorded in the spare area. After the data has been stored in the spare area, the recording operation is resumed.

The above-described embodiments can be applied to the conventional defect processing method using defect management areas (DMAs) of the DVD-RAM. When a defective block is found in the data recording area while external input data is being recorded, the defective block is registered in a secondary defect list (SDL) and the input data is temporarily stored in a buffer before being recorded in a replacement block of a spare area. Then, at a termination time-point of normal data recording, or when the buffer becomes full, the optical pickup is jumped to the spare area and the data stored in the buffer is collectively recorded in the spare area based on the secondary defect list (SDL). Values of the SDL to be recorded in a defect management area (DMA) are updated when a defect is found in advance, and are then recorded in the optical disc after the entire recording process is complete.

The above-described embodiments are useful when real-time data is recorded. The above-described embodiments can be explained using the defect processing method for the conventional DVD-RAM. Real-time data that would have otherwise been recorded in a defective block found during the recording process is temporarily stored in the buffer. The defect management information such as SDL for the identifying the defective area is then updated. After the real-time data recording operation has been completed, the data stored in the buffer can be recorded in a replacement block according to values of the SDL. Accordingly, any damage to the real-time data to be recorded in the defective block can be prevented. This case is similar to the general data recording operation. However, when the real-time data temporarily stored in the buffer exceeds a predetermined buffer capacity, the data recording operation cannot be appropriately performed.

In accordance with another embodiment of the present invention, when a defective area on the optical disc is detected, instead of recording data that would have otherwise been recorded in the defective area in the buffer, information about the defective area can be temporarily stored in the buffer. The information about the defective area may include the start and end addresses (e.g., logical sector numbers (LSNs)) of the input data. Because the start and end addresses are specified by a host recording command, the host can search for the source data, even after the recording operation is completed.

After the recording process is otherwise complete, the system uses the data stored in the buffer to locate the source data that could not be recorded in the defective area of the disc. This data is then collectively recorded in a replacement area corresponding to the defective area. In this method, a size of the buffer for temporarily storing data can be reduced. This procedure, however, does not apply to the case where real-time data is recorded. If real-time data is being received, there would be no way to retrieving the data after the normal recording operation is completed.

As apparent from the above description, the present invention provides a method for replacing a defective block with a good block to record data in an optical disc apparatus. Methods embodying the invention can continuously and quickly carry out a general data recording operation, effectively avoid a system load increase due to frequent track movements on an optical disc, and appropriately record real-time data without the loss of data.

The present invention can also be applied to defect management during data reading operations as well as data recording operations. During the data reading, the system also verifies the ECC block to find a defective area. If a defective area is found, the defective area is listed in the SDL with the addresses of the defective area and a spare area for data replacing. The recorded data in the defective area is then stored in the buffer. Other recorded data in other defective areas are also stored in the buffer during the reading process.

After the reading process is complete, the data stored in the buffer is moved to the spare area based on the SDL list.

In the above explanation, the defective area is ECC block size. But, the defective area can be a different size such as a sector size.

The preferred embodiments of the present invention have been disclosed for illustrative purposes. Those skilled in the art will appreciate that various modifications, additions and substitutions are possible, without departing from the scope and spirit of the invention as disclosed in the accompanying claims.

What is claimed is:

1. A method of recording data on an optical disk, comprising:
   performing a main recording operation to record data on the optical disk;
   storing data in a buffer when a defective portion of the optical disk is detected, wherein the data stored in the buffer is data that would have otherwise been recorded in the defective portion of the optical disk; and
   recording the data stored in the buffer in a replacement recording area of the optical,
   wherein the recording the data stored in the buffer in a replacement area of the optical disk is performed when the amount of data stored in the buffer exceeds a predetermined level.

2. The method as set forth in claim 1, wherein the recording the data stored in the buffer in a replacement area of the optical disk is performed after the main recording operation has been completed.

3. The method as set forth in claim 1, wherein the performing a main recording operation comprises skipping data recording in the defective area, and resuming the recording operation in the next good area of the optical disk.

4. The method as set forth in claim 1, wherein the size of the data stored in the buffer each time a defective portion of the optical disk is detected corresponds to a unit of an error correction code (ECC) block.

5. The method according to claim 1, further comprising defect management area (DMA) data when a defective portion of the optical disk is detected.

6. A method of recording data on an optical disc, comprising:
performing a main data recording operation to record data on the optical disk;
storing data that would have otherwise been recorded in a defective area of the optical disk into a buffer when a defective area of the optical disk is encountered during the recording operation;
comparing an amount of data stored in the buffer to a predetermined memory capacity; and
recording the data stored in the buffer into a replacement recording area of the optical disk based on a result of the comparison.

7. The method as set forth in claim 6, wherein the performing a main recording operation comprises skipping data recording in the defective area, and resuming the recording operation in the next good area of the optical disk.

8. A method of recording data on an optical disk, comprising:
storing information about a defective area of the optical disk in a buffer when a defective area is detected during a recording operation;
obtaining source data that would have been recorded in the defective area using the information about the defective area stored in the buffer and storing the obtained source data in a memory; and
recording the obtained source data in a replacement recording area of the optical disk corresponding to the defective area when an amount of data stored in the memory exceeds a predetermined level.

9. A method of recording data in a spare storage area of an optical disk, comprising:
conducting one of a data recording operation and a data reading operation;
detecting a defective area of an optical disk;
recording data intended to be stored in the defective area of the disk in a buffer; and
storing the data in the buffer in a spare storage area of the optical disk after the data recording operation or data reading operation has been completed,
wherein the recording comprises recording data intended to be stored in multiple defective areas of the optical disk in the buffer, and wherein the storing comprises storing the data in the buffer, which is from multiple defective areas, in the spare storage area of the optical disk during a single recording operation.

10. The method according to claim 9, further comprising updating defect management area (DMA) data to identify a defective area of the optical disk after the detecting has been performed.

11. The method according to claim 9, wherein the conducting comprises conducting a data recording operation, and wherein the data recorded in the buffer and stored in the spare storage area of the optical disk is data that would have otherwise been stored in the defective area of the optical disk.

12. The method according to claim 9, wherein the conducting comprises conducting a data reading operation, and wherein the data recorded in the buffer and stored in the spare storage area of the optical disk is data that would have otherwise been read from the defective area of the optical disk.

13. An apparatus for recording data on an optical disk, comprising:
means for conducting one of a data recording operation and a data reading operation;
means for detecting a defective area of an optical disk;
means for recording data intended to be stored in the defective area of the disk in a buffer; and
means for storing the data in the buffer in a spare storage area of the optical disk after the data recording operation or data reading operation has been completed
wherein the means for storing is configured to store data that would have otherwise been stored in or read from the defective area of the optical disk in the spare storage area of the optical disk.

14. The apparatus according to claim 13 wherein the means for conducting one of a data recording operation and a data reading operation comprises means for conducting a data recording operation.

15. The apparatus according to claim 13, wherein the means for conducting one of a data recording operation and a data reading operation comprises means for conducting a data reading operation.

* * * * *